US012315072B2

(12) United States Patent
Hou et al.

(10) Patent No.: US 12,315,072 B2
(45) Date of Patent: May 27, 2025

(54) MULTI-FACTOR PREDICTION OF COMPUTING RESOURCES FOR TWO-DIMENSIONAL TO THREE-DIMENSIONAL MODELING ACCELERATION

(71) Applicant: Dell Products L.P., Round Rock, TX (US)

(72) Inventors: Anzhou Hou, Shanghai (CN); Zhen Jia, Shanghai (CN); Victor Fong, Medford, MA (US); Zhisong Liu, Shenzhen (CN); Tianxiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 18/100,004

(22) Filed: Jan. 23, 2023

(65) Prior Publication Data
US 2024/0249464 A1 Jul. 25, 2024

(51) Int. Cl.
*G06T 15/08* (2011.01)
*G06T 1/20* (2006.01)

(52) U.S. Cl.
CPC ............... *G06T 15/08* (2013.01); *G06T 1/20* (2013.01)

(58) Field of Classification Search
None
See application file for complete search history.

(56) References Cited

U.S. PATENT DOCUMENTS

| 2004/0015327 | A1* | 1/2004 | Sachdeva | A61C 7/00 702/167 |
| 2004/0192239 | A1* | 9/2004 | Nakao | H04W 52/42 455/136 |
| 2020/0272515 | A1* | 8/2020 | Brady | G06F 9/5066 |

OTHER PUBLICATIONS

B. Mildenhall et al., "NeRF: Representing Scenes as Neural Radiance Fields for View Synthesis," arXiv:2003.08934v2, Aug. 3, 2020, 25 pages.
K. Park et al., "Nerfies: Deformable Neural Radiance Fields," arXiv:2011.12948v5, Sep. 10, 2021, 18 pages.
C.-Y. Weng et al., "HumanNeRF: Free-viewpoint Rendering of Moving People from Monocular Video," arXiv:2201.04127v2, Jun. 14, 2022, 15 pages.
R. Martin-Brualla et al., "NeRF in the Wild: Neural Radiance Fields for Unconstrained Photo Collections," arXiv:2008.02268v3, Jan. 6, 2021, 15 pages.
C. Reiser et al., "KiloNeRF: Speeding up Neural Radiance Fields with Thousands of Tiny MLPs," arXiv:2103.13744v2, Aug. 2, 2021, 11 pages.

(Continued)

*Primary Examiner* — James A Thompson
*Assistant Examiner* — Kim Thanh T Tran
(74) *Attorney, Agent, or Firm* — Ryan, Mason & Lewis, LLP

(57) ABSTRACT

Techniques are disclosed for multi-factor prediction of computing resources for algorithm execution. For example, a method comprises obtaining a set of factors associated with an algorithm configured to transform one or more two-dimensional images into one or more three-dimensional models. The method further comprises computing an estimated computing power value based on the set of factors. The method then comprises scheduling execution of the algorithm on one or more computing resources based on the estimated computing power value.

20 Claims, 7 Drawing Sheets

(56) References Cited

OTHER PUBLICATIONS

Sketchfab, "The Leading Platform for 3D & AR on the Web," https://sketchfab.com/, Accessed Nov. 17, 2022, 7 pages.
You Tube, "Best 3D Scanner of 2022: The 5 Best 3D Scanners Review," https://www.youtube.com/watch?app=desktop&v=hgHCuZMi4YI, Accessed Nov. 17, 2022, 3 pages.
U.S. Appl. No. 18/098,790 filed in the name of Anzhou Hou et al. filed Jan. 19, 2023, and entitled "Automated Pre-Processing for Two-Dimensional to Three-Dimensional Modeling Acceleration."

\* cited by examiner

| Method | PSNR (dB)↑ | SSIM↑ | Frame per second (FPS)↑ | GPU memory (MB)↓ | FLOPs↓ | GPUs (Nvidia) |
|---|---|---|---|---|---|---|
| NeRF | 30.23 | 0.846 | 0.04 | 5 | 1050k | V100 |
| JAXNeRF | 30.55 | 0.952 | 0.01 | 12 | 1056k | RTX 2080 |
| NeRF-SH | 31.71 | 0.958 | 165 | 1930 | 0 | V100 |
| KiloNeRF | 31.00 | 0.920 | 50 | 100 | 12k | GTX 1080 Ti |
| Autoint | 25.55 | 0.911 | 0.6 | 5 | 110k | V100 |
| DIVeR32 | 32.12 | 0.958 | 47 | 68 | 10k | GTX 1080 Ti |
| FastNeRF (no-cache) | 29.16 | 0.936 | 0.03 | 28 | 1023k | RTX 3090 |
| FastNeRF (1K Cache) | 29.97 | 0.941 | 172 | 10200 | 2.3k | RTX 3090 |
| SqueezeNeRF (no-cache) | 29.59 | 0.931 | 0.02 | 11 | 997k | Nvidia V100 |
| SqueezeNeRF | 29.61 | 0.921 | 105 | 155 | 3.1k | Nvidia V100 |
| InstantNGP | 33.18 | 0.962 | 6.7 | 3072 | - | RTX 3090 |

| Factors | Stage | Near-Linear Type | Non-Linear Type |
|---|---|---|---|
| Image Resolution | Input | ✓ | |
| Images amount | Input | ✓ | |
| Model Resolution | Output | ✓ | |
| SSIM | Output | | ✓ |
| PSNR | Output | | ✓ |
| NeRF Algorithms | Process | ✓ | |

| SSIM | Relative Factor SF |
|---|---|
| 0.958 | 1 |
| 0.96 | 1.1 |
| 0.962 | 2 |
| ... | ... |

| PSNR | Relative Factor PF |
|---|---|
| 33.2 | 1 |
| 33.3 | 1.3 |
| 33.4 | 1.8 |
| ... | ... |

| Algorithm | Relative Factor NeRF |
|---|---|
| NeRF | 1 |
| Nerfies | 0.6 |
| NeRF-in-the-wild | 0.8 |
| ... | ... |

506

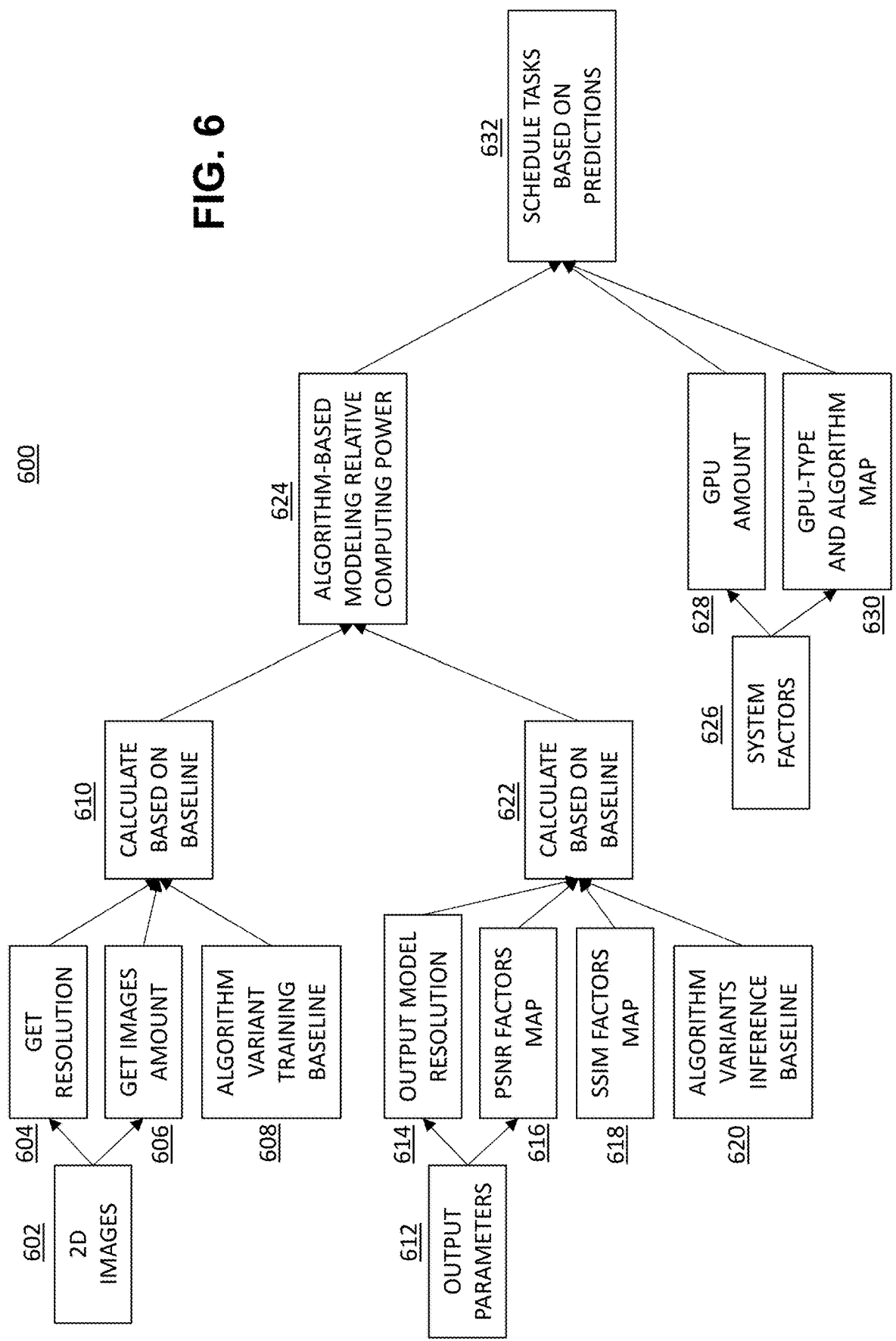

MULTI-FACTOR PREDICTION OF COMPUTING RESOURCES FOR TWO-DIMENSIONAL TO THREE-DIMENSIONAL MODELING ACCELERATION

FIELD

The field relates generally to computing environments, and more particularly to managing digital models in computing environments configured to virtually represent physical infrastructure.

BACKGROUND

Recently, techniques have been proposed to attempt to represent physical infrastructure (e.g., a physical environment with one or more physical objects) in a virtual manner to more effectively understand, simulate, manage, manipulate, or otherwise utilize the physical infrastructure.

One proposed way to represent physical infrastructure is through the creation of a digital twin architecture. A digital twin typically refers to a virtual representation (e.g., virtual copy) of a physical (e.g., actual or real) product, process, and/or system. By way of example, a digital twin can be used to understand, predict, and/or optimize performance of a physical product, process, and/or system to achieve improved operations in the computing environment in which the product, process, and/or system is implemented.

Another proposed way to represent physical infrastructure is through the creation of a metaverse-type virtual representation. The metaverse is a term used to describe an immersive virtual world accessible through virtual/augmented/mixed reality (VR/AR/MR) headsets operatively coupled to a computing platform, enabling users to virtually experience a physical environment. By way of example, a metaverse-type virtual representation can enable users to virtually experience a wide variety of applications including, but not limited to, healthcare, training, gaming, etc. Many other examples of representing physical infrastructure through the creation of virtual representations associated with VR/AR/MR applications exist.

However, management of digital models (of physical objects) in computing environments configured to virtually represent physical infrastructure (e.g., digital twin, metaverse, VR/AR/MR applications, etc.) can be a significant challenge.

SUMMARY

Embodiments provide techniques for managing digital models in computing environments configured to virtually represent objects in a physical infrastructure. More particularly, illustrative embodiments provide techniques for multi-factor prediction of computing resources for algorithm execution.

According to one illustrative embodiment, a method comprises obtaining a set of factors associated with an algorithm configured to transform one or more two-dimensional images into one or more three-dimensional models. The method further comprises computing an estimated computing power value based on the set of factors. The method then comprises scheduling execution of the algorithm on one or more computing resources based on the estimated computing power value.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 1 illustrates a benchmark table for a plurality of variants of an algorithm with which one or more illustrative embodiments can be implemented.

FIG. 4 illustrates a classification table of multiple factors for multi-factor prediction of computing resources for algorithm execution according to an illustrative embodiment.

FIGS. 5A through 5C illustrate respective relative factor tables for multi-factor prediction of computing resources for algorithm execution according to an illustrative embodiment.

FIG. 6 illustrates a methodology for multi-factor prediction of computing resources for algorithm execution according to an illustrative embodiment.

DETAILED DESCRIPTION

Figure 2:
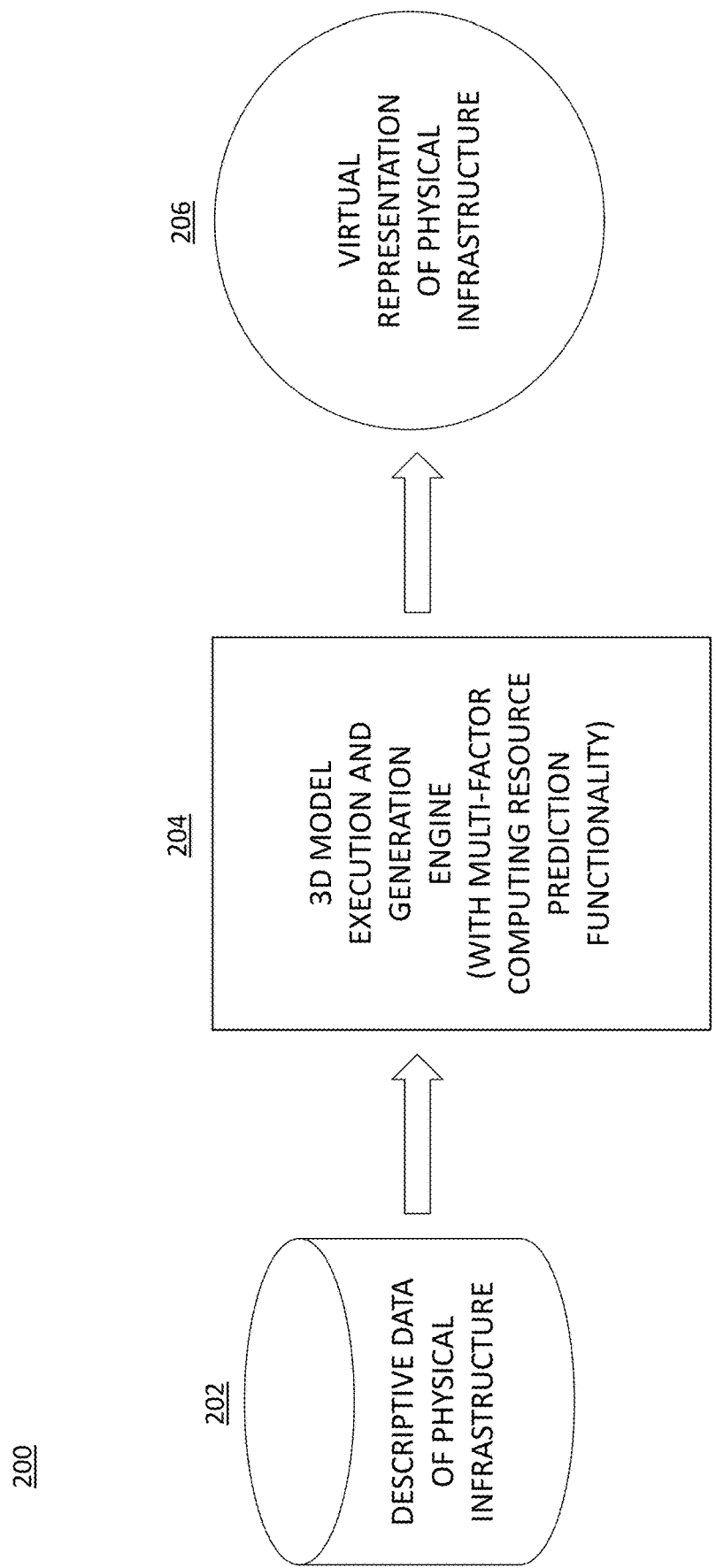
FIG. 2 illustrates a model execution and generation environment according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

It is realized herein that virtual or digital models are a vital part for immersive experiences in applications such as the metaverse and digital twin architectures, and how such digital models are built will impact the effectiveness of the virtual world.

More particularly, three-dimensional (3D) models are some of the basic components used to build a digital twin, a metaverse implementation, or any AR/VR/MR rendering. For example, in such applications, one or more 3D models are generated to represent one or more objects in the physical infrastructure being virtually represented by the application.

Further, users can build 3D scenes by themselves or combine 3D models by procuring them from available websites or by otherwise obtaining them. For example, users can design and create 3D models of objects by software such as 3DMAX, Maya, etc. Another way is using 3D scanners to scan the physical object in the real world to create one or more virtual 3D models of the objects.

SOTA is an acronym for State-Of-The-Art in the context of Artificial Intelligence (AI) and refers to the appropriate models that can be used for achieving results in a task. Currently, SOTA in the context of AI includes the concept of Neural Radiance Fields (NeRF) and its variant algorithms that are configured to transform two-dimensional (2D) images to 3D models to speed up creation of the 3D models, i.e., 2D-to-3D modeling acceleration. However, it is realized herein that different NeRF variant algorithms with different inputs and outputs may need different computing resources to execute, and the execution time for each variant is very different. It is therefore also realized herein that this presents a significant challenge for a scheduling module (scheduler) of the underlying computing platform that is executing the 2D-to-3D algorithm to schedule various 2D-to-3D modeling tasks efficiently.

By way of example only, some NeRF variants include Nerfies (e.g., for face optimization), HumanNeRF (e.g., for human body optimization), NeRF-in-the-wild (e.g., for outdoor environment optimization), and KiloNeRF (e.g., for splitting models to leverage multiple graphical processing units (GPUs) to accelerate the processing), to name a few.

To accelerate the 2D-to-3D modeling process, some NeRF variants are researched and developed in commercial and academic settings. These NeRF variants have different performances as a function of different inputs, different requirements, different types of GPUs, etc. One example of a NeRF variant benchmark for 800×800 images is shown in table 100 of FIG. 1.

As shown in table 100, two measures are computed for different NeRF variants, i.e., peak signal-to-noise ratio (PSNR) which measures pixel-level differences between ground truth and estimation, and structural similarity index measure (SSIM) which measures structural similarity between ground truth and estimation. It can be seen in table 100 that frames per second (FPS) results extend from 0.01 to 172. As is realized herein, performance between NeRF variants is very different, the time to finish training tasks between NeRF variants is very different, and the requirements for GPU resources or other accelerator types for executing NeRF variants are very different. Thus, how to schedule the 2D-to-3D modeling tasks (of the 2D-to-3D algorithm) to best utilize the GPU resources is realized herein to be a critical issue to 2D-to-3D algorithm execution. For example, assume one task can be finished in five minutes, and another task with the same priority needs to be finished in ten hours. A conventional task scheduler tends to schedule the short-time task before the long-time task, but this might not always be the appropriate (e.g., optimal, substantially optimal, best, appropriate, etc.) scheduling approach for every algorithm execution use case.

Illustrative embodiments provide technical solutions that overcome the above and other challenges with existing digital model management by providing automated multi-factor prediction of computing resources for algorithm execution in the context of 2D-to-3D modeling acceleration. More particularly, one or more illustrative embodiments provide a combined linear (comprising near-linear) and non-linear multi-factor method to predict computing resources for execution of a 2D-to-3D algorithm task (workload).

Referring initially to FIG. 2, a model execution and generation engine environment 200 is generally depicted according to an illustrative embodiment. As shown, descriptive data of a physical infrastructure 202 (e.g., 2D images of one or more objects in the physical infrastructure) is input to a 3D model execution and generation engine 204.

As will be explained in further detail herein, 3D model execution and generation engine 204 comprises multi-factor computing resource prediction functionality which enables more efficient execution of a 2D-to-3D algorithm. It is realized herein that when the 2D-to-3D algorithm is a NeRF-based algorithm and the NeRF algorithm variant is poorly executed, one or more significant disadvantages ensue. For example, the performance of the underlying computing environment (e.g., computing resources such as, e.g., compute nodes, storage nodes, network nodes, etc.) used to process the NeRF algorithm is negatively impacted. Multi-factor computing resource prediction functionality overcomes these and other disadvantages as will be evident herein.

In accordance with execution of the 2D-to-3D algorithm, 3D model execution and generation engine 204 schedules, executes, and generates (renders) a virtual representation of the physical infrastructure 206. The virtual representation can be used, by way of example only, in digital twin, virtual-immersion, VR/AR/MR, and any computer vision or AI applications.

Figure 3:
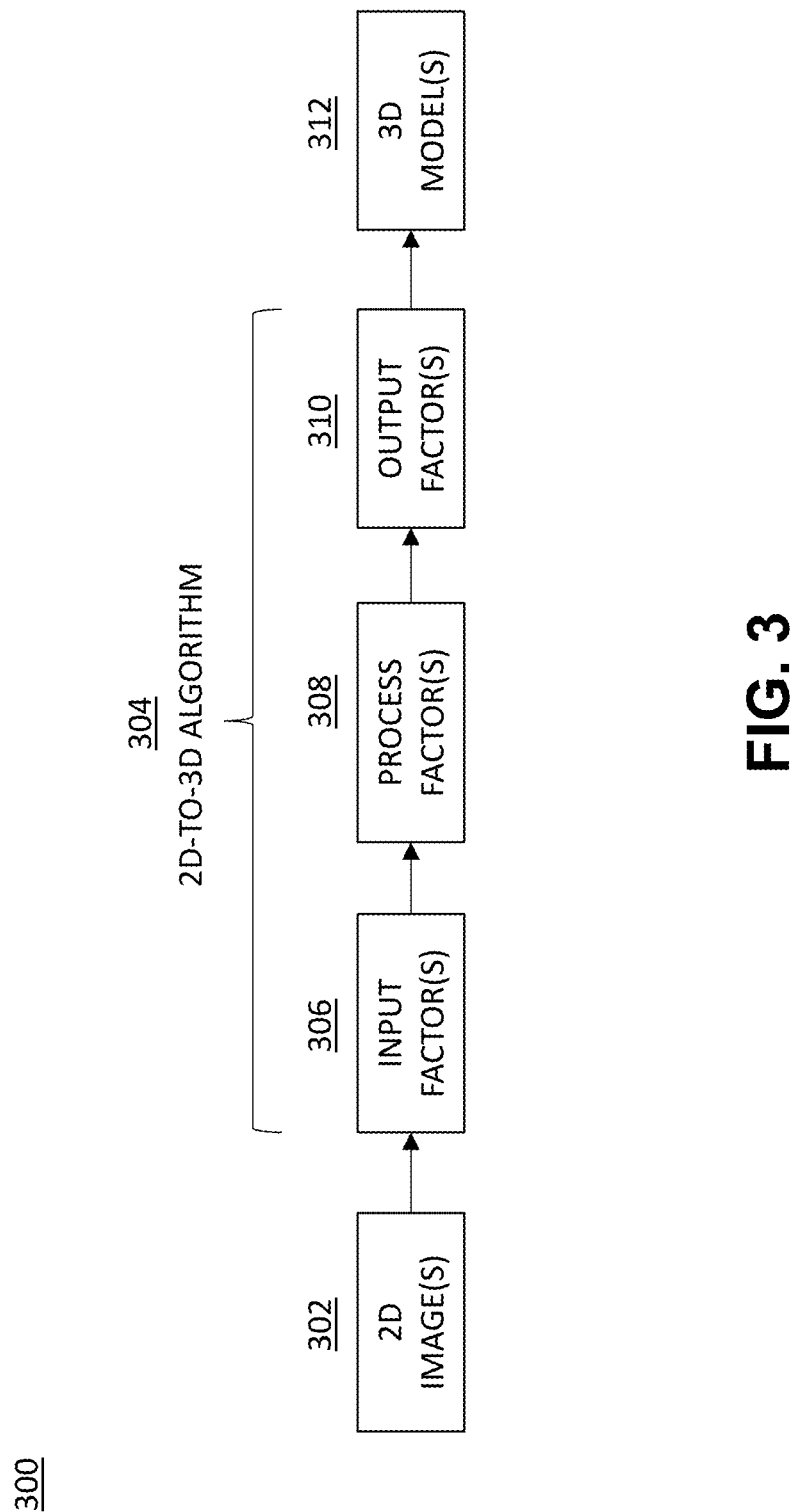
FIG. 3 illustrates multiple factors for multi-factor prediction of computing resources for algorithm execution according to an illustrative embodiment.

Turning now to FIG. 3, multiple factors for multi-factor prediction of computing resources for algorithm execution according to an illustrative embodiment are generally depicted. As shown in a 2D-to-3D algorithm process flow 300, one or more 2D images 302 are received by a 2D-to-3D algorithm 304 (e.g., a NeRF variant) which has multiple factors which impact execution by one or more computing resources, i.e., one or more input factors 306, one or more process factors 308, and one or more output factors 310. As further generally depicted, 2D-to-3D algorithm 304 generates one or more 3D models 312 as further explained herein.

To address the above-mentioned and other technical problems with 2D-to-3D algorithm execution, one or more input factors 306, one or more process factors 308, and one or more output factors 310 are used to predict relative computing resources (e.g., a measure representing a level of computing power) needed to execute one or more tasks (e.g., workloads) of 2D-to-3D algorithm 304. As will be illustratively explained below, one or more input factors 306, one or more process factors 308, and one or more output factors 310 can comprise both linear (comprising near-linear) and non-linear factor types as part of the multi-factor method to predict relative computing resources of tasks.

It is realized herein that a 2D-to-3D modeling task not only has a training process but also has an inference process, as part of the entire modeling process, and as such, the impacting factors can be separated into the three factor stages shown in FIG. 3 (i.e., input, process, and output). Based on analysis of workloads and factors which impact computing resources, it is realized herein that the computing power of 2D-to-3D modeling relies on factors such as, by way of example, input images resolution, output quality, the selected algorithm, and the available computing resources (e.g., GPUs). Accordingly, to more accurately estimate computing power needed, illustrative embodiments classify the input, process, and output factors (306, 308, and 310, respectively) into one of two types: (i) near-linear factor type; and (ii) non-linear factor type. By way of example only, near-linear type factors and non-linear type factors can be mathematically calculated and/or experientially/experimentally calculated.

FIG. 4 illustrates a classification table 400 of multiple factors for multi-factor prediction of computing resources for algorithm execution according to an illustrative embodiment. As shown, factors 402 through 412 each correspond to one of the three factor stages (i.e., input, process, and output) described above, and are classified as one of a near-linear type or a non-linear type.

More particularly, factor 402 is images resolution which refers to the 2D resolution of an input 2D image, e.g., 500×500, 1000×1000, and so on. Factor 402 is associated with the input stage of the 2D-to-3D algorithm, i.e., part of input factor(s) 306 of 2D-to-3D algorithm 304, and is classified as a near-linear factor type.

Factor 404 is images amount which refers to the quantity of 2D images to be used to generate one or more 3D models, e.g., tens of, hundreds of, thousands of 2D images. Factor 404 is associated with the input stage of the 2D-to-3D algorithm, i.e., part of input factor(s) 306 of 2D-to-3D algorithm 304, and is classified as a near-linear factor type.

Factor 406 is model resolution which refers to the 3D resolution of an output 3D model, e.g., 500×500×500, 800×800×800, and so on. Factor 406 is associated with the output stage of the 2D-to-3D algorithm, i.e., part of output factor(s) 310 of 2D-to-3D algorithm 304, and is classified as a near-linear factor type.

Factor 408 is a structural similarity index measure (SSIM) which measures pixel-level differences between ground truth and estimation. Factor 408 is associated with the output stage of the 2D-to-3D algorithm, i.e., part of output factor(s) 310 of 2D-to-3D algorithm 304, and is classified as a non-linear factor type.

Factor 410 is a peak signal-to-noise ratio (PSNR) which measures structural similarity between ground truth and estimation. Factor 410 is associated with the output stage of the 2D-to-3D algorithm, i.e., part of output factor(s) 310 of 2D-to-3D algorithm 304, and is classified as a non-linear factor type.

Factor 412 is the NeRF algorithm type (e.g., generalized and variants), e.g., Nerfies, HumanNeRF, NeRF-in-the-wild, and so on (see other NeRF variant examples in FIG. 1). Factor 412 is associated with the process stage of the 2D-to-3D algorithm, i.e., part of process factor(s) 308 of 2D-to-3D algorithm 304, and is classified as a near-linear factor type.

In one illustrative embodiment, a method to calculate the required relative computing power is as follows (referred to herein as Equation (1)):

$$\begin{aligned}&\text{Required\_relative\_Computing\_Power} = \\ & (\text{Train\_Base} \times iRF \times AF + \text{Inference-Base} \times oRF \times SF \times PF) \times \\ & \hspace{4cm} \text{NeRF\_Algorithm\_Factor}\end{aligned}$$

Each variable (factor or otherwise value) in Equation (1) is defined as follows:

Required_Relative_Computing_Power: Illustrative embodiments use a measure of relative computing power instead of a measure of absolute computing power because when a computing system schedules tasks, the relative value is sufficient to give the scheduler a relative reference to schedule the computing resources for task execution. The relative measure will be further explained below on a non-limiting example.

Train_Base: A value representing one selected typical scene as the train (training) base, for example, the train base can be set to 100 input 2D images each with resolution 1024×1024.

iRF: Input Resolution Factor is the result of the 2D images resolution (factor 402) divided by 1024×1024, for example, if the image resolution is 512×512, the iRF is 0.25.

AF: Amount Factor is the result of the number of 2D input images (factor 404) divided by 100, for example, if the amount is 300, the AF is 300/100=3.

Inference_Base: An experiential value compared with Train_Base. Typically, the inference workload is much less than the training workload, so the Inference_Base can be set to 0.05 in this example oRF: Output Resolution Factor is the result of the 3D model resolution (factor 406) divided by 1024×1024×1024, for example, if the image resolution is 2048×2048×2048, the oRF is 4.

SF: The factor for SSIM; an experiential or experimental relative value which can be obtained from a SSIM and workloads map. For example, in experiment or experience-based results with the same other conditions: if the SSIM value is 0.958, its duration is 1 hr (hours); if the SSIM value is 0.962, its duration is 1.1 hrs; if the SSIM value is 0.962, its duration is 2 hrs. With such corresponding values, a SSIM and workloads mapping table (map) can be built in this manner. FIG. 5A illustrates an example of such a map in the form of a relative factor table 502 for SSIM.

PF: The factor for PSNR; an experiential or experimental relative value which can be obtained from a PSNR and workloads map. For example, in experiment or experience-based results with the same other conditions: if the PSNR value is 33.2, its duration is 1 hrs; if the PSNR value is 33.3 value is 0.962, its duration is 1.3 hrs; if the PSNR value is 33.4, its duration is 1.8 hrs. With such corresponding values, a PSNR and workloads mapping table (map) can be built in this manner. FIG. 5B illustrates an example of such a map in the form of a relative factor table 504 for PSNR.

NeRF Algorithm Factor: The factor for NeRF and its variants; an experiential or experimental relative value based on the NeRF algorithm type. For example, in experiment or experience-based results with the same other conditions: if the algorithm type is the (generalized) NeRF algorithm, the duration is 1 hrs; if the algorithm type is the Nerfies algorithm, the duration is 0.6 hrs; if the algorithm type is the NeRF-in-the-wild algorithm, the duration is 0.8 hrs. With such corresponding values, a NeRF algorithm factor and workloads mapping table (map) can be built in this manner. FIG. 5C illustrates an example of such a map in the form of a relative factor table 506 for the NeRF algorithm factor.

An example calculation using the required relative computing power based on the example tables in FIGS. 4, 5A, 5B, and 5C is as follows. Assume 3D model execution and generation engine 204 of FIG. 2 inputs 200 2D images, the resolution is 2048×2048, the resolution of the output 3D model is 1024×1024×1024, the SSIM value is 0.96, the PSNR value is 33.3, and the NeRF-in-the-wild is used to process the 2D-to-3D modeling. The estimated relative computing power according to Equation (1) is:

$$(1 \times (2 \times 2) \times 2 + 0.05 \times 1 \times 1.1 \times 1.3 \times 0.6) \times 0.8 = (8 + 0.04) \times 0.8 = 6.432.$$

Then, the platform scheduler associated with 3D model execution and generation engine 204 could compare this prediction and other 2D-to-3D modeling workload predictions and/or actual past workload executions to schedule the tasks to different types/numbers of GPUs. For example, 6.432 is a value to be compared to other similarly calculated values for other predictions and/or past executions of the 2D-to-3D algorithm, and from such comparison, the number and type of computing resources (e.g., GPUs) can be determined, scheduled, and then deployed for execution of the 2D-to-3D algorithm.

Referring now to FIG. 6, a methodology 600 for multi-factor prediction of computing resources for algorithm execution according to an illustrative embodiment is depicted. While methodology 600 can be performed in 3D model execution and generation engine 204 of FIG. 2, it is to be appreciated that methodology 600 can be performed in other system architectures in alternative embodiments.

Methodology 600 corresponds to Equation (1), wherein recall that Required_Relative_Computing_Power is calculated as: (Train_Base×iRF×AF+Inference-Base×ORF×SF× PF)×NeRF_Algorithm_Factor.

As shown, methodology 600 receives 2D images in step 602. The resolution of the 2D images is determined in step 604, and the amount (quantity, number, etc.) of images is determined in step 606. Methodology 600 also determines the selected algorithm variant's training baseline in step 608. Step 610 then calculates Train_Base×iRF×AF from Equation (1) as explained above.

Methodology 600 receives output parameters (e.g., SSIM, PSNR, 3D model resolution) in step 612. The resolution of the output 3D model is obtained in step 614, a PSNR relative factor map (table 504) is obtained in step 616, and a SSIM relative factor map (table 502) is obtained in step 618. Methodology 600 also determines the selected algorithm variant's inference baseline in step 620. Step 622 then calculates Inference-Base×ORF×SF×PF from Equation (1) as explained above.

In step 624, the calculation result of step 610 and the calculation result of step 622 are added and the sum is then multiplied by the NeRF_Algorithm_Factor from Equation (1) to obtain the Required_Relative_Computing_Power value as explained above.

As further shown, methodology 600 also inputs system factors 626 describing one or more underlying computing systems that are candidates to execute the selected 2D-to-3D algorithm. In step 628, methodology 600 then determines available GPU amounts and, in step 630, determines or otherwise accesses a GPU type-to-algorithm type mapping. Recall that, as illustrated in table 100 of FIG. 1, some NeRF algorithm variants operate better with certain types of GPU environments. Step 632 then schedules computing resources for task execution based on the predictions provided by step 624 (i.e., required relative computing power). A 3D model is generated based on the task executions.

Advantageously, as illustratively explained herein, a method of combined multi-factor prediction for 2D-to-3D modeling relative computing resources is performed. As explained, the factors are separated into three stages, and into linear (comprising near-linear) and non-linear types, and a relative value is used instead of an absolute value to predict the required computing resource for scheduling.

Figure 7:
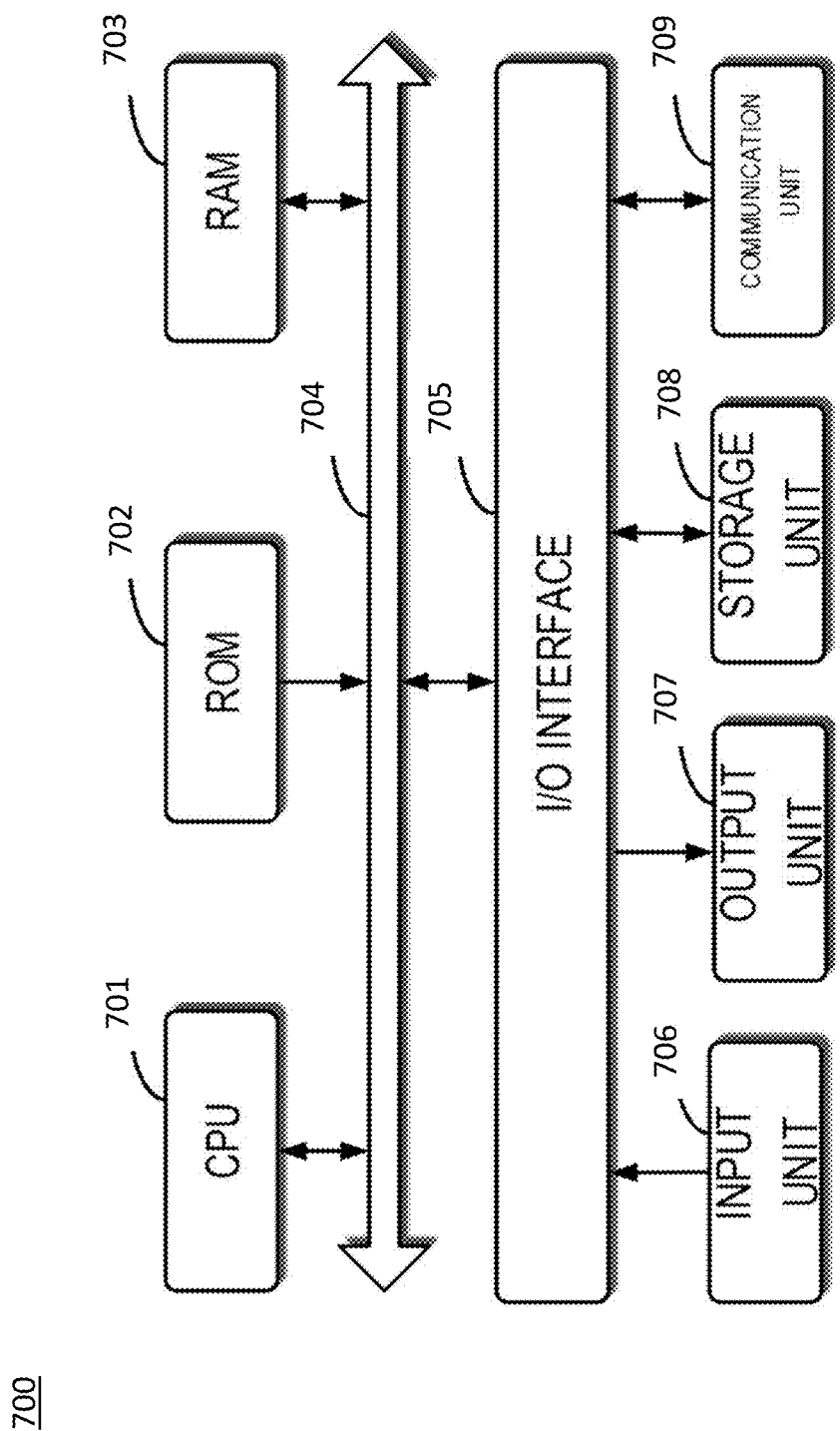
FIG. 7 illustrates a processing platform for an information processing system used to implement model execution and generation functionality according to an illustrative embodiment.

FIG. 7 illustrates a block diagram of an example processing device or, more generally, an information processing system 700 that can be used to implement illustrative embodiments. For example, one or more components in FIGS. 1-6 can comprise a processing configuration such as that shown in FIG. 7 to perform steps/operations described herein. Note that while the components of system 700 are shown in FIG. 7 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 700 can include multiple processing devices, each of which comprise the components shown in FIG. 7.

As shown, the system 700 includes a central processing unit (CPU) 701 which performs various appropriate acts and processing, based on a computer program instruction stored in a read-only memory (ROM) 702 or a computer program instruction loaded from a storage unit 708 to a random-access memory (RAM) 703. The RAM 703 stores therein various programs and data required for operations of the system 700. CPU 701, the ROM 702 and the RAM 703 are connected via a bus 704 with one another. An input/output (I/O) interface 705 is also connected to the bus 704.

The following components in the system 700 are connected to the I/O interface 705, comprising: an input unit 706 such as a keyboard, a mouse and the like; an output unit 707 including various kinds of displays and a loudspeaker, etc.; a storage unit 708 including a magnetic disk, an optical disk, etc.; a communication unit 709 including a network card, a modem, and a wireless communication transceiver, etc. Communication unit 709 allows system 700 to exchange information/data with other devices through a computer network such as the Internet and/or various kinds of telecommunications networks.

Various processes and processing described above may be executed by the CPU 701. For example, in some embodiments, methodologies described herein may be implemented as a computer software program that is tangibly included in a machine-readable medium, e.g., storage unit 708. In some embodiments, part or all of the computer programs may be loaded and/or mounted onto the system 700 via ROM 702 and/or communication unit 709. When the computer program is loaded to the RAM 703 and executed by the CPU 701, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages, or other programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general-purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    obtaining a set of factors associated with an algorithm configured to transform one or more two-dimensional images into one or more three-dimensional models;
    computing an estimated computing power value based on the set of factors; and
    scheduling execution of the algorithm on one or more computing resources based on the estimated computing power value;
    wherein obtaining, computing, and scheduling are performed by at least one processor and at least one memory storing executable computer program instructions.

2. The method of claim 1, wherein the set of factors associated with the algorithm comprise one or more input stage factors, one or more process stage factors, and one or more output stage factors.

3. The method of claim 2, wherein the one or more input stage factors, the one or more process stage factors, and the one or more output stage factors are classified as one of a linear type and a non-linear type.

4. The method of claim 2, wherein the one or more input stage factors comprise an image resolution value of the one or more two-dimensional images and a quantitative value of the one or more two-dimensional images.

5. The method of claim 4, wherein the one or more process stage factors comprise an algorithm type indicator.

6. The method of claim 5, wherein the one or more output stage factors comprise a model resolution value of the one or more three-dimensional models, a structural similarity index measure, and a peak signal-to-noise ratio.

7. The method of claim 1, wherein relative measures of a subset of the set of factors are obtained and used to compute the estimated computing power value.

8. The method of claim 1, wherein a training baseline value and an inference baseline value of the one or more three-dimensional models are used to compute the estimated computing power value.

9. The method of claim 1, wherein the estimated computing power value comprises a relative measure which is compared to one or more other computing power values to determine the one or more computing resources that are to be scheduled for execution of the algorithm.

10. The method of claim 1, further comprising executing the algorithm to transform the one or more two-dimensional images into the one or more three-dimensional models based on the scheduling.

11. An apparatus, comprising:
at least one processor and at least one memory storing computer program instructions wherein, when the at least one processor executes the computer program instructions, the apparatus is configured to:
obtain a set of factors associated with an algorithm configured to transform one or more two-dimensional images into one or more three-dimensional models;
compute an estimated computing power value based on the set of factors; and
schedule execution of the algorithm on one or more computing resources based on the estimated computing power value.

12. The apparatus of claim 11, wherein the set of factors associated with the algorithm comprise one or more input stage factors, one or more process stage factors, and one or more output stage factors.

13. The apparatus of claim 12, wherein the one or more input stage factors, the one or more process stage factors, and the one or more output stage factors are classified as one of a linear type and a non-linear type.

14. The apparatus of claim 12, wherein the one or more input stage factors comprise an image resolution value of the one or more two-dimensional images and a quantitative value of the one or more two-dimensional images.

15. The apparatus of claim 14, wherein the one or more process stage factors comprise an algorithm type indicator.

16. The apparatus of claim 15, wherein the one or more output stage factors comprise a model resolution value of the one or more three-dimensional models, a structural similarity index measure, and a peak signal-to-noise ratio.

17. The apparatus of claim 11, wherein relative measures of a subset of the set of factors are obtained and used to compute the estimated computing power value.

18. The apparatus of claim 11, wherein a training baseline value and an inference baseline value of the one or more three-dimensional models are used to compute the estimated computing power value.

19. The apparatus of claim 11, wherein the estimated computing power value comprises a relative measure which is compared to one or more other computing power values to determine the one or more computing resources that are to be scheduled for execution of the algorithm.

20. A computer program product stored on a non-transitory computer-readable medium and comprising machine executable instructions, the machine executable instructions, when executed, causing a processing device to perform steps of:
obtaining a set of factors associated with an algorithm configured to transform one or more two-dimensional images into one or more three-dimensional models;
computing an estimated computing power value based on the set of factors; and
scheduling execution of the algorithm on one or more computing resources based on the estimated computing power value.

* * * * *